United States Patent
Raab et al.

(10) Patent No.: US 8,381,524 B2
(45) Date of Patent: Feb. 26, 2013

(54) RECIPROCATING EXPANSION ENGINE AND PISTON OF A RECIPROCATING EXPANSION ENGINE

(75) Inventors: Gottfried Raab, Perg (AT); Markus Raup, Attnang-Puchheim (AT); Josef Klammer, Garsten (AT); Roland Kirchberger, Graz (AT); Michael Lang, Graz (AT)

(73) Assignee: MAN Nutzfahrzeuge Oesterreich AG, Steyr (AT)

( * ) Notice: Subject to any disclaimer, the term of this patent is extended or adjusted under 35 U.S.C. 154(b) by 737 days.

(21) Appl. No.: 12/535,480

(22) Filed: Aug. 4, 2009

(65) Prior Publication Data
US 2010/0083659 A1    Apr. 8, 2010

(30) Foreign Application Priority Data
Aug. 4, 2008    (AT) .................................. 1204/2008

(51) Int. Cl.
*F02G 3/00* (2006.01)
*F01B 29/04* (2006.01)
*F01B 1/00* (2006.01)
*F01B 31/00* (2006.01)
*F01B 11/02* (2006.01)
*F02B 41/00* (2006.01)
*F02B 75/32* (2006.01)
*F02F 1/00* (2006.01)
*F16J 1/00* (2006.01)

(52) U.S. Cl. ............... 60/712; 60/619; 60/620; 60/624; 91/152; 92/86; 92/172; 123/26; 123/193.6; 123/197.3

(58) Field of Classification Search ............... 60/517, 60/614, 560, 619, 712; 123/46 R, 50 R, 70 R, 123/71 R, 53.1, 53.3, 53.6, 62, 197.1, 26; 92/86, 170 R, 172; 91/152
See application file for complete search history.

(56) References Cited

U.S. PATENT DOCUMENTS

| | | | | |
|---|---|---|---|---|
| 1,162,775 A | * | 12/1915 | Hesselman | 92/86 |
| 1,432,799 A | * | 10/1922 | Stackhouse | 123/193.6 |
| 1,562,692 A | * | 11/1925 | De Rochefort-Lucay | 123/432 |
| 2,103,787 A | * | 12/1937 | McCrary | 123/44 A |
| 2,212,167 A | * | 8/1940 | Peterson | 60/712 |
| 2,278,019 A | * | 3/1942 | Phillips | 277/440 |
| 2,497,781 A | * | 2/1950 | Logashkin | 123/41.35 |
| 2,559,484 A | * | 7/1951 | Waring | 60/619 |
| 2,638,390 A | * | 5/1953 | Neeme | 277/451 |
| 2,814,551 A | * | 11/1957 | Broeze et al. | 60/525 |

(Continued)

FOREIGN PATENT DOCUMENTS

| | | |
|---|---|---|
| DE | 26 52 177 | 6/1977 |
| DE | 3429727 A1 * | 2/1986 |

(Continued)

*Primary Examiner* — Thai Ba Trieu
(74) *Attorney, Agent, or Firm* — Cozen O'Connor

(57) ABSTRACT

A piston and a reciprocating expansion engine with a piston having a piston head, a piston neck, and a piston shaft are described. The piston head has at least one groove which runs in a circumferential direction suitable for receiving a piston ring, and the piston shaft has a pin boss and, at its outer circumference, a guide surface which is suitable for guiding the piston along a cylinder inner wall. An outer diameter of the piston neck is smaller than an outer diameter of the piston head and/or of the piston shaft, and the length of the piston neck approximately corresponds to the travel of the piston in the installed state.

19 Claims, 2 Drawing Sheets

U.S. PATENT DOCUMENTS

| | | | | |
|---|---|---|---|---|
| 2,827,348 | A * | 3/1958 | Olson | 277/484 |
| 2,831,461 | A * | 4/1958 | Kupka | 91/152 |
| 3,200,798 | A * | 8/1965 | Mansfield | 123/48 B |
| 3,747,478 | A * | 7/1973 | Dunn et al. | 92/165 R |
| 4,004,421 | A * | 1/1977 | Cowans | 60/516 |
| 4,475,739 | A * | 10/1984 | Nakajima et al. | 277/442 |
| 4,522,163 | A * | 6/1985 | Hooper | 123/193.6 |
| 4,532,896 | A * | 8/1985 | Nakahara et al. | 123/193.5 |
| 4,615,531 | A * | 10/1986 | Green | 277/446 |
| 4,912,923 | A * | 4/1990 | Lin | 60/624 |
| 5,261,362 | A * | 11/1993 | Regueiro | 123/193.6 |
| 5,327,987 | A | 7/1994 | Abdelmalek | |
| 5,894,729 | A * | 4/1999 | Proeschel | 60/560 |
| 6,672,263 | B2 * | 1/2004 | Vallejos | 123/197.3 |
| 7,028,476 | B2 * | 4/2006 | Proeschel | 60/646 |
| 7,121,232 | B1 * | 10/2006 | Janhunen | 123/26 |
| 7,383,808 | B1 * | 6/2008 | Azevedo et al. | 123/193.6 |
| 7,389,755 | B2 * | 6/2008 | Noland | 123/70 R |
| 7,845,171 | B2 * | 12/2010 | Moller et al. | 60/620 |
| 7,895,978 | B2 * | 3/2011 | Moss | 123/193.6 |
| 7,997,080 | B2 * | 8/2011 | Harmon et al. | 60/614 |
| 2007/0017478 | A1 * | 1/2007 | Noland | 123/193.6 |
| 2007/0074695 | A1 * | 4/2007 | Gildemeister et al. | 123/193.6 |
| 2007/0193443 | A1 * | 8/2007 | Adolfsson | 123/193.6 |
| 2009/0260595 | A1 * | 10/2009 | Fujiwara | 123/193.6 |
| 2009/0301426 | A1 * | 12/2009 | Ko | 123/193.6 |

FOREIGN PATENT DOCUMENTS

| | | | |
|---|---|---|---|
| EP | 0 084 790 | | 8/1983 |
| EP | 1 870 575 | | 12/2007 |
| JP | 55037505 | A * | 3/1980 |
| WO | WO 2005/080836 | | 9/2005 |
| WO | WO 2005/106233 | | 11/2005 |

* cited by examiner

RECIPROCATING EXPANSION ENGINE AND PISTON OF A RECIPROCATING EXPANSION ENGINE

BACKGROUND OF THE INVENTION

1. Field of the Invention

The invention is directed to a piston of a reciprocating expansion engine and to a reciprocating expansion engine for use in a steam circuit of a heat recovery circuit connected to an internal combustion engine in which a piston of this type can preferably be used. The piston has a piston head, a piston neck, and a piston shaft. The piston head has at least one groove which runs in a circumferential direction for receiving a piston ring. The piston shaft has a receptacle for a piston pin and, at its outer circumference, a guide surface for guiding the piston along an inner wall of a cylinder.

2. Description of the Related Art

In the development and advancement of internal combustion engines, work in recent years has focused mainly on minimizing pollutants and increasing the efficiency of the units. In this connection, one possibility for increasing efficiency in modern internal combustion engines is to use the heat generated in the area of the internal combustion engine. By taking appropriate measures, it is possible to limit the structural dimensions of the required cooling system and make use of the lost heat, which would otherwise merely be given off into the environment, for other applications within the motor vehicle.

To make the most efficient use of the heat lost in the area of an internal combustion engine, there is an increasing push toward the development of heat recovery systems within which the heat generated at the internal combustion engine is transferred to a heat transfer fluid and is rendered usable by a steam engine located in a secondary heat circuit.

Publication DE 34 29 727 A1 discloses a combustion/steam compound engine that uses process heat whereby fuel consumption is minimized, chiefly by a steam engine arranged downstream of the internal combustion engine. In the drive unit, which is referred to in this publication as a compound engine, a portion of the waste heat generated in the internal combustion engine is transferred to the coolant water which is brought to boiling. The steam generated by the boiling coolant water is then stored under pressure in a steam boiler and is made available subsequently to a steam engine. The driving torque generated by the steam engine is transmitted to a crankshaft of the internal combustion engine.

EP 1 870 575 A2 describes a charged internal combustion engine of a motor vehicle having a cooling circuit in which a work medium circulates and is at least partially changed to a vaporous or gaseous aggregate state. In this case, an expander unit is provided in operative connection with a driven shaft of the internal combustion engine by a drivetrain. In the expander unit described in this reference, a driven shaft of the expander unit is moved by a conversion of the energy contained in the at least partially vaporous or gaseous work medium. The expander unit described in this reference is constructed as a two-stroke piston engine in operative connection, indirectly or directly by means of the drivetrain, with the driven shaft of the internal combustion engine.

SUMMARY OF THE INVENTION

Proceeding from the technical solutions known from the prior art, that is, particularly the known reciprocating expansion engines for making use of the waste heat generated in an internal combustion engine by means of a steam circuit, it is an object of the invention to provide a piston and a reciprocating expansion engine by which efficient use can be made of the energy contained in the steam and, therefore, of the waste heat generated in an internal combustion engine based on relatively simple constructional means. Beyond this, chiefly a reliable starting of a reciprocating expansion engine acted upon by steam and an effective separation of the oil circuit and steam circuit are realized by the technical solutions provided herein. By separating the oil circuit and steam circuit, these circuits are reliably prevented from contaminating one another with their respective media.

According to one embodiment of the invention, a piston of a reciprocating expansion engine has a piston head, a piston neck, and a piston shaft. The piston head has at least one groove which runs in a circumferential direction and is suitable for receiving a piston ring. The piston shaft has a receptacle suitable for receiving a piston pin and has, at its outer circumference, a guide surface for guiding the piston along a cylinder inner wall. The piston has been further developed in such a way that an outer diameter of the piston neck is smaller than an outer diameter of the piston head and/or of the piston shaft.

A piston constructed according to one embodiment of the invention is characterized in that, in addition to the piston head which is commonly provided and which is also referred to as a piston ring zone, and in addition to the piston shaft, a piston neck that clearly separates the piston head from the piston shaft is provided between the two areas mentioned above. The piston shaft and the piston head are separated by a spacing in longitudinal direction owing to the piston neck located therebetween and by providing a smaller outer diameter of the piston neck.

In one embodiment of the invention, the piston shaft provides a groove in an area adjoining the piston neck, which groove runs in a circumferential direction of the piston and is suitable for receiving a seal. The seal is preferably constructed as a rod seal. The rod seal provides a hollow space in which oil and oil-containing residues from the oil-conducting area of the cylinder can collect substantially between two sealing elements arranged at the respective edge areas of the groove. In particular, a correspondingly constructed rod seal prevents oil or oil-containing residues from reaching the area of the piston neck and/or the steam-conducting area of the cylinder.

The length of the piston neck, which has a reduced outer diameter in relation to the piston head and the piston shaft, is constructed such that the length of the piston neck corresponds at least approximately to the travel of the piston in the installed state. As a result of this constructional feature of the piston neck, it is ensured that vaporous fluid or steam escaping from the expansion zone of the cylinder through the piston ring zone can collect in the area of the piston neck and preferably expands in the corresponding hollow space. Further, a possibility offered by this embodiment form of the piston neck consists in that the blow-by gas, in particularly the blow-by steam, collecting in the collecting space, which is the hollow space between the piston neck and the inner wall of the cylinder, can be drawn out of the collecting space at any time during the movement of a piston through a corresponding opening within the inner wall of the cylinder. Steam that is drawn out in this way can be reintroduced into the steam circuit in a particularly suitable manner and therefore does not go to waste as regards the overall system.

In another embodiment of the invention, at least one leakage channel is provided in the piston shaft of the piston and forms a connection through which a fluid can flow between an area surrounding the piston neck and an area below the piston shaft. It is conceivable to construct this at least one leakage channel either as a bore hole inside the piston shaft or, alternatively or in addition, as a channel which opens on one side toward the inner wall of the cylinder and which is incorporated in the surface of the piston shaft and connects the hollow space within the groove between the two sealing elements of the rod seal to the oil area.

The at least one leakage channel ensures that oil, which reaches the groove inside the piston shaft in a seal is provided for sealing the oil area relative to the collecting space of the piston shaft, can be guided back into the oil area.

Therefore, the inventive construction of a piston for a steam-operated reciprocating expansion engine ensures that sealing is carried out by piston rings in the area of the piston head relative to the expansion area of the cylinder filled with steam, that sealing is carried out in the area of the piston shaft relative to the oil area by providing a corresponding seal, preferably a rod seal, and that a collecting space is provided in the area of the piston neck located between the piston head and piston shaft in longitudinal direction of the piston, this collecting space forming a hollow space between the outer wall of the piston neck and the inner wall of the cylinder in the installed state of the piston. A piston constructed according to one embodiment of the invention achieves a safe separation of the steam area and oil-conducting area within the cylinder and ensures that blow-by steam can collect in the collecting space surrounding the piston neck and is ultimately carried off in a reliable manner and supplied to the steam circuit.

The guiding of a piston constructed according to one embodiment of the invention takes place on the oil side so that lubrication is ensured at all times. As was already described, sealing of the oil side is carried out by corresponding seals, preferably rod seals. Minimal leakage collecting in the area of this seal is guided to the underside of the piston shaft or of the piston and, therefore, back to the oil side by at least one leakage return channel. Further, the piston shaft is responsible in particular for absorbing lateral forces that occur because the piston is alternately pressed against the cylinder wall during its operation. Among other results, this causes a tilting of the piston and the noise associated with it. This tilting of the piston can be countered by minimizing piston play and in particular by increasing the length of the piston shaft. Another step for reducing piston tilting consists in axially offsetting the piston pin.

One embodiment of the invention is directed to a reciprocating expansion engine used to increase the efficiency of the drive unit by using lost heat from the internal combustion engine. A reciprocating expansion engine constructed according to one embodiment of the invention has at least two cylinders whose expansion spaces are connected at least partially and at least occasionally to a steam circuit by at least one inlet valve and in which a piston in a working connection with a crankshaft by a connecting rod movable between top dead center and bottom dead center. A reciprocating expansion engine according to the invention is characterized in that the crankshaft is constructed in such a way that as soon as at least one cylinder is at the bottom dead center position at least one other cylinder is already past the top dead center. As a result of the geometry described above, a cylinder is positioned past the top dead center when the other cylinder is at the bottom dead center position. A construction of this kind ensures that a reverse rotation or a reverse running of the reciprocating expansion engine is prevented.

In one embodiment of the invention, the reciprocating expansion engine has two cylinders whose center axes are arranged parallel to one another and so as to be offset relative to one another in the installed position. This arrangement of the cylinders and, the pistons moving in the cylinders is implemented through a corresponding construction of the crank mechanism.

A reciprocating expansion engine according to one embodiment of the invention is advantageously characterized in that the inlet valve and a bypass valve are arranged in parallel. A bypass valve of this kind ensures automatic self-starting of the reciprocating expansion engine in the correct direction.

One embodiment form of the reciprocating expansion engine is characterized in that at least one of the pistons used has the above-described features. Accordingly, the piston in a reciprocating expansion engine, described above, is constructed such that a hollow space which is suitable as a collecting space for fluids is provided between a wall of the cylinder and an outer surface of a piston neck of the piston in the installed state. A construction of this kind is preferably achieved in that the piston neck of the piston guided inside the cylinder has a smaller outer diameter than the piston head and piston shaft. Vaporous fluid that reaches the collecting space from the steam-conducting areas of the cylinder interior, particularly from the expansion space, in spite of the piston rings provided in the area of the piston head is captured by a correspondingly dimensioned collecting space and sufficiently expanded.

In one embodiment of the invention, an opening is provided in the area of the inner wall of the cylinder through which vaporous fluid in the collecting space are carried out into a low-pressure area of the steam circuit.

In a one embodiment of the reciprocating expansion engine according to the invention, the opening within the cylinder wall is constructed such that it is located at all times in the area of the collecting space in spite of the movement of the piston between top dead center and bottom dead center. In this case, the length of the piston neck between the piston head and the piston shaft is dimensioned such that the length of the piston neck corresponds at least to the travel of the piston during the operation of the reciprocating expansion engine. Since the collecting space is connected to the low-pressure area of the steam circuit, no pressure builds up in the collecting space, and the blow-by gas and vaporous fluid or blow-by steam forming in the collecting space can easily be guided back into the steam circuit again.

According, to one embodiment of the invention a piston having a piston neck in an area between the piston head and the piston shaft, which piston neck has a smaller outer diameter compared to the piston neck and the piston shaft, is used in a reciprocating expansion engine. This construction of a piston is advantageously combined with the sealing in the area of the piston head by at least one piston ring in the area of the piston shaft by means of at least one rod seal. In this way a safe separation is carried out between the actual work medium, that is, a vaporous fluid, and the oil required for the lubrication of the piston, crankshaft bearing and connecting rod bearing. Accordingly, there is no mutual contamination of the oil and steam media or, if any, at least only minimal contamination.

According to another embodiment, the cylinder inner wall comprises at least two parts, a first part in an area of the piston head and a second part in the area of the piston shaft, wherein the first part and the second part are each one a first and a second material.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described more fully in the following with reference to the drawings without limiting the general inventive idea. In the drawings.

DETAILED DESCRIPTION OF THE PRESENTLY PREFERRED EMBODIMENTS

Figure 1:
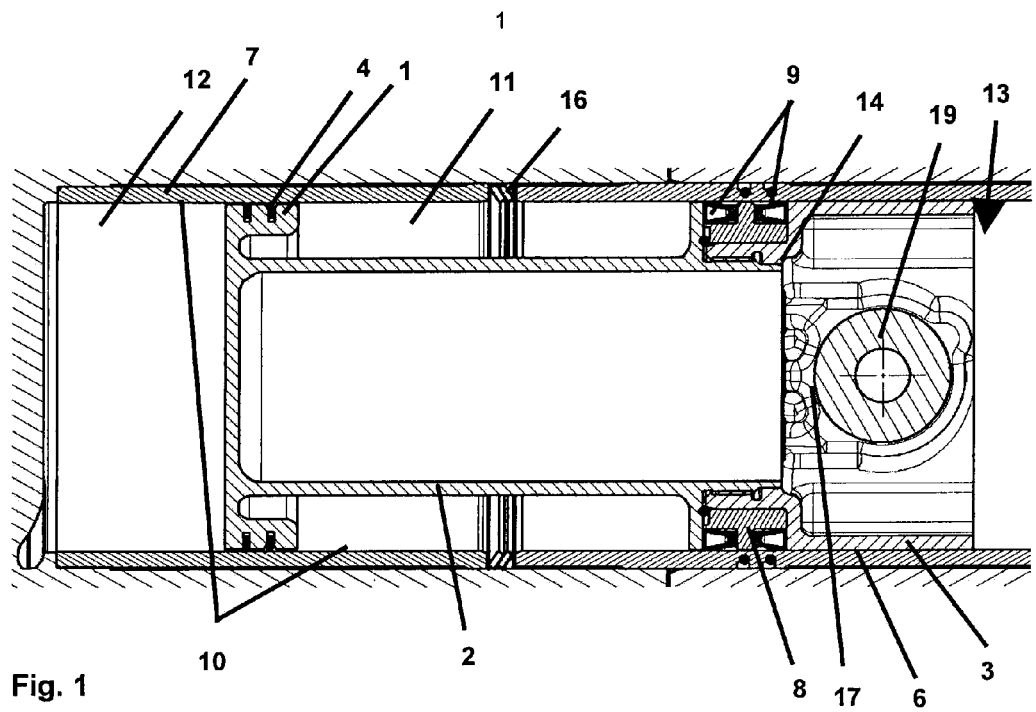
FIG. 1 is a sectional view of a piston constructed according to one embodiment of the invention.

FIG. 1 depicts a piston having a piston head 1, a piston neck 2, and a piston shaft 3. The piston head 1 has two grooves 4 that run in a circumferential direction and are constructed for receiving corresponding piston rings 5. The piston shaft 3 has a guide surface 6 by which the piston is guided inside the cylinder 7 during operation. Two grooves 8, in which seals constructed as a rod seals 9 are located, are provided in the upper area of the piston shaft 3 in the immediate vicinity of the piston neck 2.

In comparison to the piston head 1 and piston shaft 3, the piston neck 2 has a reduced outer diameter and ensures a spatial distance between the piston head 1 and the piston shaft 3 in longitudinal direction of the piston. When a piston constructed according to the invention is installed within the cylinder 7, a hollow space is formed between the piston neck 2 and the cylinder inner wall 10. This hollow space is provided as a collecting space 11 for vaporous fluid which, so-called blow-by steam, reaches this collecting space 11 from the expansion space 12 of the cylinder 7, to which steam is admitted, in spite of the fact that corresponding piston rings 5 are provided.

The piston is guided on the oil side inside a cylinder by a guide surface 6 which forms at least part of the outer surface of the piston shaft 3. This guide surface 6 in particular absorbs the lateral forces acting on the piston.

The rod seals 9 provided within the grooves 8 ensure sealing relative to the oil-conducting area 13 of the cylinder 7 and enclose a hollow space 14 extending in circumferential direction of the piston. Oil which collects in this hollow space 14, between the two sealing elements of the rod seal 9, is guided back out of this hollow space 14 into the oil-conducting area 13 via corresponding leakage return channels 15 (FIG. 2).

An opening 16 forms a fluid-tight connection between the collecting space 11 and a low-pressure area of the steam circuit (not shown). The opening 16 is located in cylinder inner wall 10 in the area of the collecting space 11. The opening 16 in the cylinder inner wall 10 is constructed and the length of the piston neck 2 is dimensioned such that the opening 16 is located in the area of the collecting space 11 at all times during the movement of the piston between top dead center and bottom dead center. Vaporous fluid which reaches collecting space 11, in spite of the piston rings 5, is expanded and is ultimately guided into a low-pressure area of the steam circuit via the opening 16 in cylinder inner wall 10.

Sealing by piston rings 5 in the area of the piston head 1 and sealing in the area of the piston shaft 3 by a rod seal 9 in combination with a piston neck 2 in whose outer area a collecting space 11 is formed for blow-by gas, particularly steam, ensures that there is only minimal mutual contamination, if any, between the oil and the steam work medium. In this respect, the technical solution according to the invention is chiefly characterized in that it realizes a corresponding sealing by means of relatively simple constructional elements.

Figure 2:
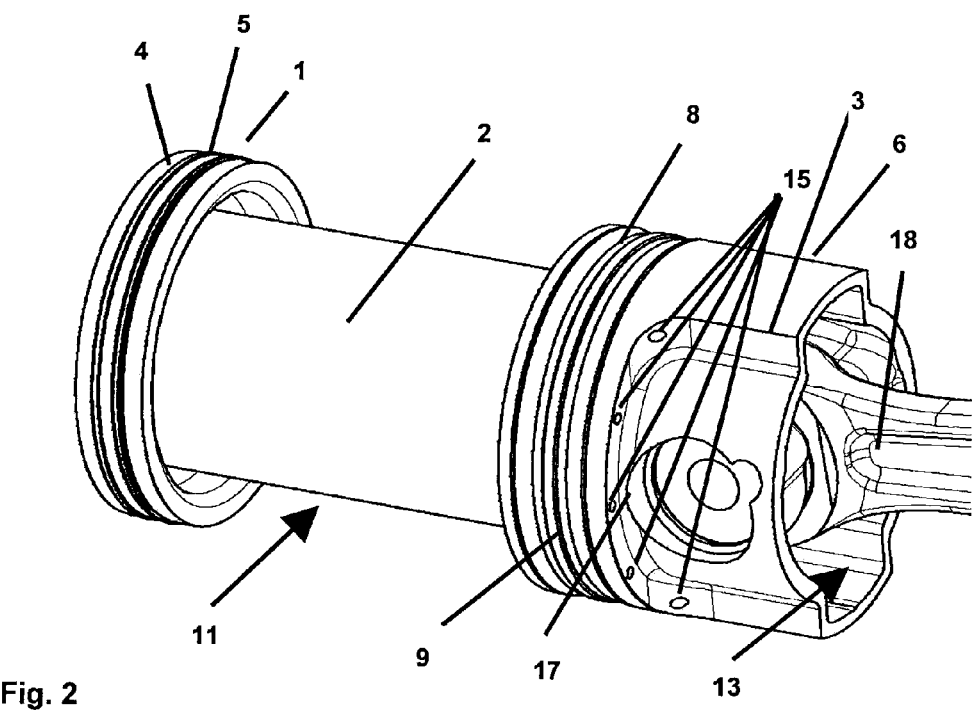
FIG. 2 is a perspective view of the outer side of the piston constructed according to one embodiment of the invention.

FIG. 2 is a perspective view of the outer side of a piston constructed according to one embodiment of the invention. The guidance of the piston within the cylinder 7 is carried out by means of the guide surface 6 provided in the area of the piston shaft 2. Further, two pin bosses 17 are provided in the area of the piston shaft 3, the connecting rod 18 being fastened therein by means of a corresponding pin 19. As soon as a correspondingly constructed piston is set in linear motion inside the cylinder 7 by expansion of compressed steam within the expansion space 12, the connecting rod 18 is set in motion. The linear movement of the piston is transmitted to a crankshaft 20 (FIG. 3.) via the connecting rod 18 and is thereby changed into rotational movement. The crankshaft 20 of the reciprocating expansion engine 21 is in mechanical working connection with the crankshaft of an internal combustion engine (not shown) directly or indirectly, e.g., by means of an overrunning clutch.

Figure 3:
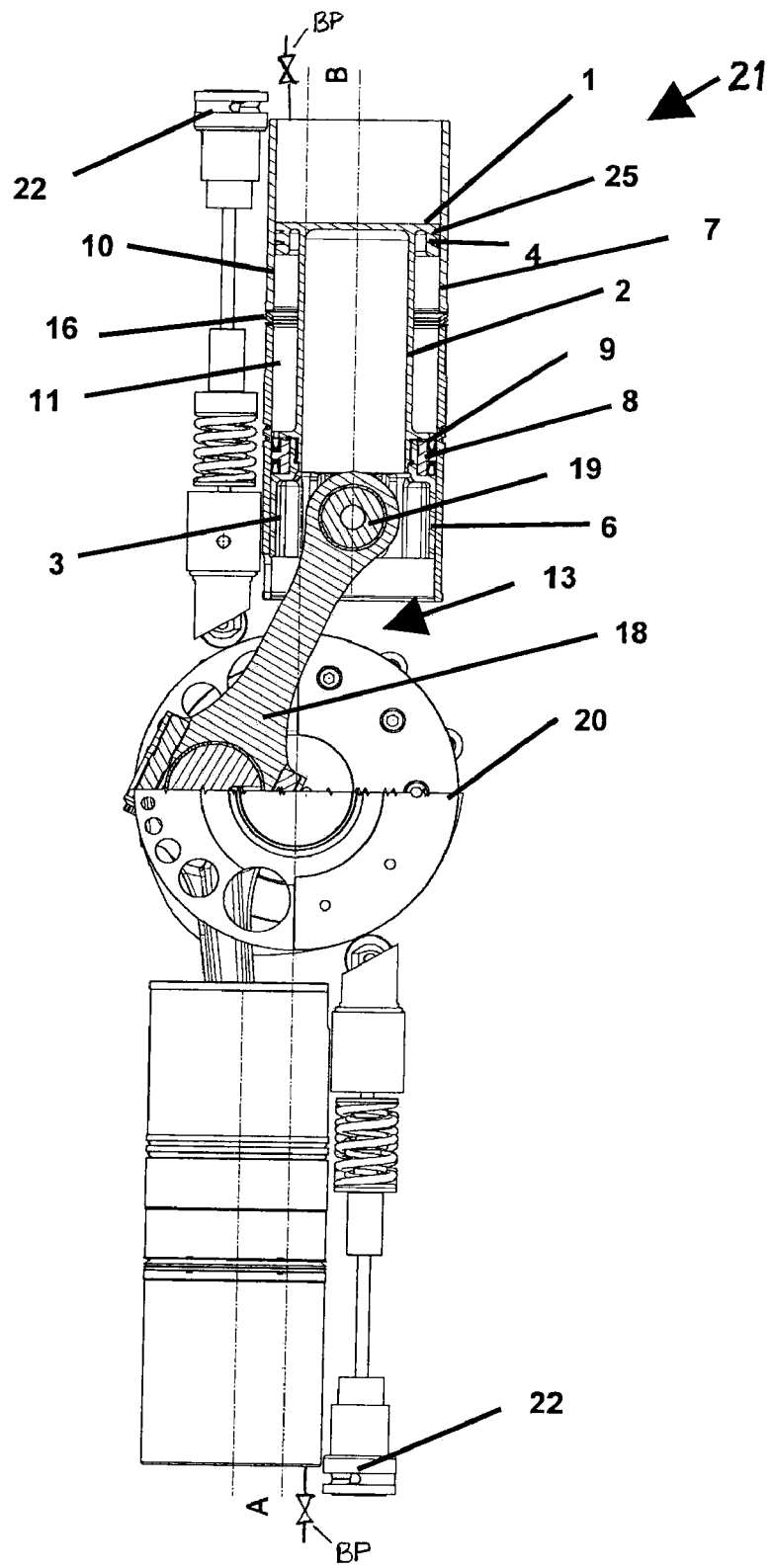
FIG. 3 is a schematic diagram of the crank mechanism geometry of a reciprocating expansion engine constructed according to the invention with a crankshaft and two cylinders.

FIG. 3 shows a reciprocating expansion engine 21 constructed according to the invention which has two cylinders 7. Further, two spring-loaded inlet valves 22 whose movement is likewise influenced by the rotation of the crankshaft 20 are shown schematically. The cylinders 7 and the pistons moving in the cylinders are arranged in such a way that the center axes of the cylinders 7 extend parallel to one another so as to be offset relative to one another by distance A=B. A corresponding arrangement of the cylinders 7 relative to one another is achieved by means of a suitably implemented crank mechanism geometry. The center axes of the cylinders are preferably offset relative to one another by 25 mm.

Due to the geometry shown in FIG. 3, it is ensured that the cylinder 7 shown on the left-hand side is arranged past the top dead center when the cylinder shown on the right-hand side is at bottom dead center. The same orientation occurs when the pistons are located in the respective opposed end position, which ensures that when steam flows in via a bypass valve BP arranged parallel to the inlet valve 22 of a cylinder the piston of a cylinder moves into the bottom dead center and the inlet valve of the other respective cylinder located past the top dead center is accordingly open, and the reciprocating expansion engine automatically starts in the correct direction when acted upon by steam. The bypass valve BP arranged parallel to the inlet valve is provided in the cylinder heads for positioning the reciprocating expansion engine 21 in one of the two starting points, this bypass valve BP producing a connection between the expansion space 12 and the steam supply.

In a warm-up phase of the reciprocating expansion engine 21 constructed according to the invention, the work medium, which is still liquid, or the wet steam is not guided via the expansion space 12 of the cylinder 7, but rather is first guided via heating lines in the cylinder head with a downstream throttle valve. In this way, the cylinders 7 are heated initially. As soon as there is sufficient heat and the mass flow of the heat transfer fluid can be completely evaporated, the system pressure inside the steam supply increases, and steam flows through the bypass valves into the heated expansion spaces 12 of the cylinders 7. That cylinder not positioned in the exhaust phase is pressed in direction of the bottom dead center. In this way, the inlet valve of the opposite cylinder is opened and the expander starts automatically when acted upon by steam.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method of using a reciprocating expansion engine in a drive unit, wherein the reciprocating expansion engine has at least two cylinders comprising respective expansion spaces;
   at least one inlet valve configured to at least partially and occasionally connect the respective expansion spaces to a steam circuit;
   a crankshaft;
   at least two connecting rods connected to the at least two cylinders;
   a piston in each of the at least two cylinders, each piston in working connection with the crankshaft by a respective on one of the connecting rods, each piston configured for movement between top dead center and bottom dead center of the cylinder,
   wherein the crankshaft is configured such that as soon as at least one piston of one of the cylinders is at the bottom dead center the at least one other piston of another one of the cylinders is already arranged past the top dead center,
   wherein each of the pistons in their installed state form a hollow space between a cylinder inner wall and an outer surface of a piston neck configured for collecting fluids; said method comprising:
   transferring heat generated in an internal combustion engine to a heat transfer fluid;
   changing the heat transfer fluid at least partially into a vaporous aggregate state;
   expanding the at least partially vaporous heat transfer fluid in the reciprocating expansion engine creating a linear motion that is translated into a torque;
   transmitting the torque to a crankshaft of the reciprocating expansion engine; and
   at least partially transmitting the torque to a driven shaft of the drive unit.

2. A piston for a reciprocating expansion engine comprising:
   a piston head, the piston head having at least one piston head circumferential groove configured for receiving a piston ring;
   a piston shaft, the piston shaft comprising a pin boss configured for receiving a piston pin and an outer circumferential guide configured for guiding the piston along a cylinder inner wall; and
   a piston neck coupling the piston head to the piston shaft, wherein an outer diameter of the piston neck is smaller than at least one of an outer diameter of the piston head and an outer diameter of the piston shaft, whereby the neck provides a spacing between the piston shaft and the piston head.

3. The piston according to claim 2, wherein the piston shaft comprises at least one piston shaft circumferential groove in an area adjoining the piston neck configured for receiving a seal.

4. The piston according to claim 3, wherein the seal is a rod seal.

5. The piston according to claim 3, wherein the piston shaft comprises at least one leakage return channel configured for fluidically connecting the piston shaft circumferential groove and an area below the piston shaft opposite the piston head.

6. The piston according to claim 5, wherein the at least one leakage return channel is a fluid-tight bore hole within the piston shaft.

7. The piston according to claim 2, wherein a length of the piston neck corresponds to a travel of the piston in its installed state in the reciprocating expansion engine.

8. A piston for a reciprocating expansion engine comprising:
   a piston head, the piston head having at least one piston head circumferential groove configured for receiving a piston ring;
   a piston shaft, the piston shaft comprising a pin boss configured for receiving a piston pin and an outer circumferential guide configured for guiding the piston along a cylinder inner wall; and
   a piston neck coupling the piston head to the piston shaft, wherein an outer diameter of the piston neck is smaller than at least one of an outer diameter of the piston head and an outer diameter of the piston shaft, wherein the piston shaft comprises at least one piston shaft circumferential groove in an area adjoining the piston neck configured for receiving a seal, wherein the piston shaft comprises at least one leakage return channel configured for fluidically connecting the piston shaft circumferential groove and an area below the piston shaft opposite the piston head, and wherein the at least one leakage return channel is a groove in a longitudinal direction of the piston incorporated in the piston shaft.

9. A reciprocating expansion engine comprising:
   at least two cylinders comprising respective expansion spaces;
   at least one inlet valve configured to at least partially and occasionally connect the respective expansion spaces to a steam circuit;
   a crankshaft;
   at least two connecting rods connected to the at least two cylinders;
   a piston in each of the at least two cylinders, each piston in working connection with the crankshaft by a respective on one of the connecting rods, each piston configured for movement between top dead center and bottom dead center of the cylinder, each piston comprising:
   a piston head, the piston head having at least one piston head circumferential groove configured for receiving a piston ring;
   a piston shaft, the piston shaft comprising a pin boss configured for receiving a piston pin and an outer circumferential guide configured for guiding the piston along a cylinder inner wall; and
   a piston neck coupling the piston head to the piston shaft, wherein an outer diameter of the piston neck is smaller than at least one of an outer diameter of the piston head and an outer diameter of the piston shaft, whereby the neck provides a spacing between the piston shaft and the piston head, wherein the crankshaft is configured such that as soon as at least one piston of one of the cylinders is at the bottom dead center the at least one other piston of another one of the cylinders is already arranged past the top dead center.

10. The reciprocating expansion engine according to claim 9, further comprising a bypass valve arranged fluidically parallel to the inlet valve.

11. The reciprocating expansion engine according to claim 9, wherein two of the at least two cylinders are arranged such that their respective longitudinal center axes are parallel to one another and offset relative to one another in the installed position.

12. The reciprocating expansion engine according to claim 9, wherein each of the pistons in their installed state form a hollow space between a cylinder inner wall and an outer surface of a piston neck configured for collecting fluids.

13. The reciprocating expansion engine according to claim 12, wherein each of the at least two pistons comprises a piston head having respective piston rings, the piston head having respective piston rings configured to sealingly separate a collecting space in the hollow space from a steam-conducting expansion space of the cylinder.

14. The reciprocating expansion engine according to claim 13, wherein the collecting space is sealed relative to an oil-conducting area of the crankshaft for each respective cylinder interior by at least one seal provided in a respective piston shaft of each respective piston.

15. The reciprocating expansion engine according to claim 14, wherein each of the respective seals is a rod seal.

16. The reciprocating expansion engine according to claim 15, wherein the cylinder inner wall comprises an opening in the collecting space the opening configured for coupling the collecting space and the steam circuit.

17. The reciprocating expansion engine according to claim 16, wherein the collecting space is configured for connection to a low-pressure area of the steam circuit in a fluid-tight manner by the opening.

18. The reciprocating expansion engine according to claim 16, wherein the opening is arranged in the cylinder inner wall such that the opening is always located in the area of the collecting space during a movement of the piston between top dead center and bottom dead center.

19. The reciprocating expansion engine according to claim 11, wherein the cylinder inner wall comprises at least two parts, a first part in an area of the piston head and a second part in the area of the piston shaft, wherein the first part and the second part are each one a first and a second material.

\* \* \* \* \*